United States Patent
Schulze et al.

(10) Patent No.: US 10,671,625 B2
(45) Date of Patent: Jun. 2, 2020

(54) PROCESSING A QUERY PRIMITIVE CALL ON A VALUE IDENTIFIER SET

(71) Applicant: SAP SE, Walldorf (DE)

(72) Inventors: Robert Schulze, Walldorf (DE); Oliver Horn, Walldorf (DE); Klaus Otto Mueller, Karlsruhe (DE)

(73) Assignee: SAP SE, Walldorf (DE)

( * ) Notice: Subject to any disclaimer, the term of this patent is extended or adjusted under 35 U.S.C. 154(b) by 333 days.

(21) Appl. No.: 15/416,729

(22) Filed: Jan. 26, 2017

(65) Prior Publication Data

US 2018/0210926 A1     Jul. 26, 2018

(51) Int. Cl.
| | |
|---|---|
| *G06F 16/24* | (2019.01) |
| *G06F 16/248* | (2019.01) |
| *G06F 16/25* | (2019.01) |
| *G06F 16/2455* | (2019.01) |
| *G06F 16/2453* | (2019.01) |

(52) U.S. Cl.
CPC ........ *G06F 16/248* (2019.01); *G06F 16/2455* (2019.01); *G06F 16/258* (2019.01); *G06F 16/24542* (2019.01)

(58) Field of Classification Search
CPC .. G06F 16/248; G06F 16/2455; G06F 16/258; G06F 16/24542
USPC ................ 707/705, 713, 722, 769
See application file for complete search history.

(56) References Cited

U.S. PATENT DOCUMENTS

| | | | |
|---|---|---|---|
| 5,761,652 A * | 6/1998 | Wu | ..... G06F 16/2264 |
| 5,918,225 A | 6/1999 | White et al. | |
| 6,374,236 B1 | 4/2002 | Chen et al. | |
| 7,174,553 B1 | 2/2007 | Reed et al. | |
| 7,337,174 B1 | 2/2008 | Craig | |
| 7,797,342 B2 | 9/2010 | Banks et al. | |
| 7,805,456 B2 | 9/2010 | Meijer et al. | |
| 8,977,600 B2 | 3/2015 | Crupi et al. | |
| 9,165,021 B2 | 10/2015 | Bhattacharjee et al. | |

(Continued)

FOREIGN PATENT DOCUMENTS

EP     2930629     10/2015

OTHER PUBLICATIONS

Neumann, Thomas. "Efficiently compiling efficient query plans for modern hardware." Proceedings of the VLDB Endowment 4.9 (2011): 539-550.

(Continued)

*Primary Examiner* — Hares Jami
(74) *Attorney, Agent, or Firm* — Mintz Levin Cohn Ferris Glovsky and Popeo, P.C.

(57) ABSTRACT

In some example embodiments, a system is provided for executing a primitive call that implements a query operation. The system may include a data processor and a memory. The memory may store instructions that result in operations when executed by the data processor. The operations may include: executing, at an data management engine, the primitive call by at least performing a first operation with respect to a value identifier set, the value identifier set including one or more value identifiers, and the primitive call being configured to access a database storing a plurality of value identifiers; and generating, based at least on a result of the first operation, a result for the primitive call. Related methods and articles of manufacture, including computer program products, are also described.

19 Claims, 5 Drawing Sheets

(56) References Cited

U.S. PATENT DOCUMENTS

| | | |
|---|---|---|
| 9,298,768 B2 | 3/2016 | Varakin et al. |
| 9,495,207 B1 | 11/2016 | Pjesivac-Grbovic et al. |
| 1,015,251 A1 | 12/2018 | Rajan |
| 2001/0037322 A1* | 11/2001 | Lindsay ............ G06F 16/24557 |
| 2002/0035559 A1 | 3/2002 | Crowe et al. |
| 2004/0015511 A1 | 1/2004 | Seefeldt et al. |
| 2004/0078364 A1 | 4/2004 | Ripley et al. |
| 2004/0162822 A1 | 8/2004 | Papanyan et al. |
| 2004/0230559 A1 | 11/2004 | Newman et al. |
| 2005/0028134 A1 | 2/2005 | Zane et al. |
| 2005/0080755 A1 | 4/2005 | Aoyama |
| 2005/0138000 A1* | 6/2005 | Roux ................. G06F 16/3347 |
| 2007/0239797 A1 | 10/2007 | Cattell |
| 2007/0250470 A1 | 10/2007 | Duffy et al. |
| 2008/0033960 A1 | 2/2008 | Banks et al. |
| 2008/0098053 A1 | 4/2008 | Miao et al. |
| 2008/0281786 A1 | 11/2008 | Duffy et al. |
| 2008/0281846 A1 | 11/2008 | Hoang et al. |
| 2009/0006429 A1 | 1/2009 | Champion et al. |
| 2009/0030874 A1 | 1/2009 | Das et al. |
| 2009/0228434 A1 | 9/2009 | Krishnamurthy et al. |
| 2010/0114973 A1* | 5/2010 | Goyal ............. G06F 16/90344 707/802 |
| 2010/0131550 A1* | 5/2010 | Nakadai ................. H04L 45/00 707/769 |
| 2010/0262633 A1 | 10/2010 | Bhattacharjee et al. |
| 2010/0281017 A1 | 11/2010 | Hu et al. |
| 2011/0066668 A1 | 3/2011 | Guarraci |
| 2012/0084315 A1 | 4/2012 | Schneider et al. |
| 2013/0054630 A1 | 2/2013 | Briggs et al. |
| 2013/0073573 A1 | 3/2013 | Huang et al. |
| 2013/0151502 A1 | 6/2013 | Yoon et al. |
| 2014/0081950 A1 | 3/2014 | Rajan |
| 2014/0089294 A1 | 3/2014 | Shankar et al. |
| 2014/0108861 A1 | 4/2014 | Abadi et al. |
| 2014/0172914 A1 | 6/2014 | Elnikety et al. |
| 2014/0280030 A1 | 9/2014 | Freedman et al. |
| 2014/0280037 A1 | 9/2014 | Petride et al. |
| 2014/0351233 A1 | 11/2014 | Crupi |
| 2015/0026154 A1 | 1/2015 | Jeong et al. |
| 2015/0178305 A1 | 6/2015 | Mueller et al. |
| 2015/0186461 A1 | 7/2015 | Nica |
| 2015/0193500 A1 | 7/2015 | Aute et al. |
| 2015/0261820 A1 | 9/2015 | Cheng et al. |
| 2015/0269228 A1 | 9/2015 | Fisher et al. |
| 2016/0055348 A1* | 2/2016 | Lewak ................. G06F 21/6227 713/193 |
| 2016/0098448 A1 | 4/2016 | McShane |
| 2017/0024433 A1 | 1/2017 | Neelakanthappa et al. |
| 2017/0228425 A1 | 8/2017 | Kandula et al. |
| 2017/0262516 A1 | 9/2017 | Horowitz et al. |
| 2017/0308547 A1 | 10/2017 | Gupta |
| 2018/0150513 A1 | 5/2018 | Willems et al. |
| 2018/0150514 A1 | 5/2018 | Willems et al. |
| 2018/0150515 A1 | 5/2018 | Merker |

OTHER PUBLICATIONS

Herodotu, Query Optimization techniques for partitioned tables, Jun. 12-16, 2011, pp. 49-60.

* cited by examiner

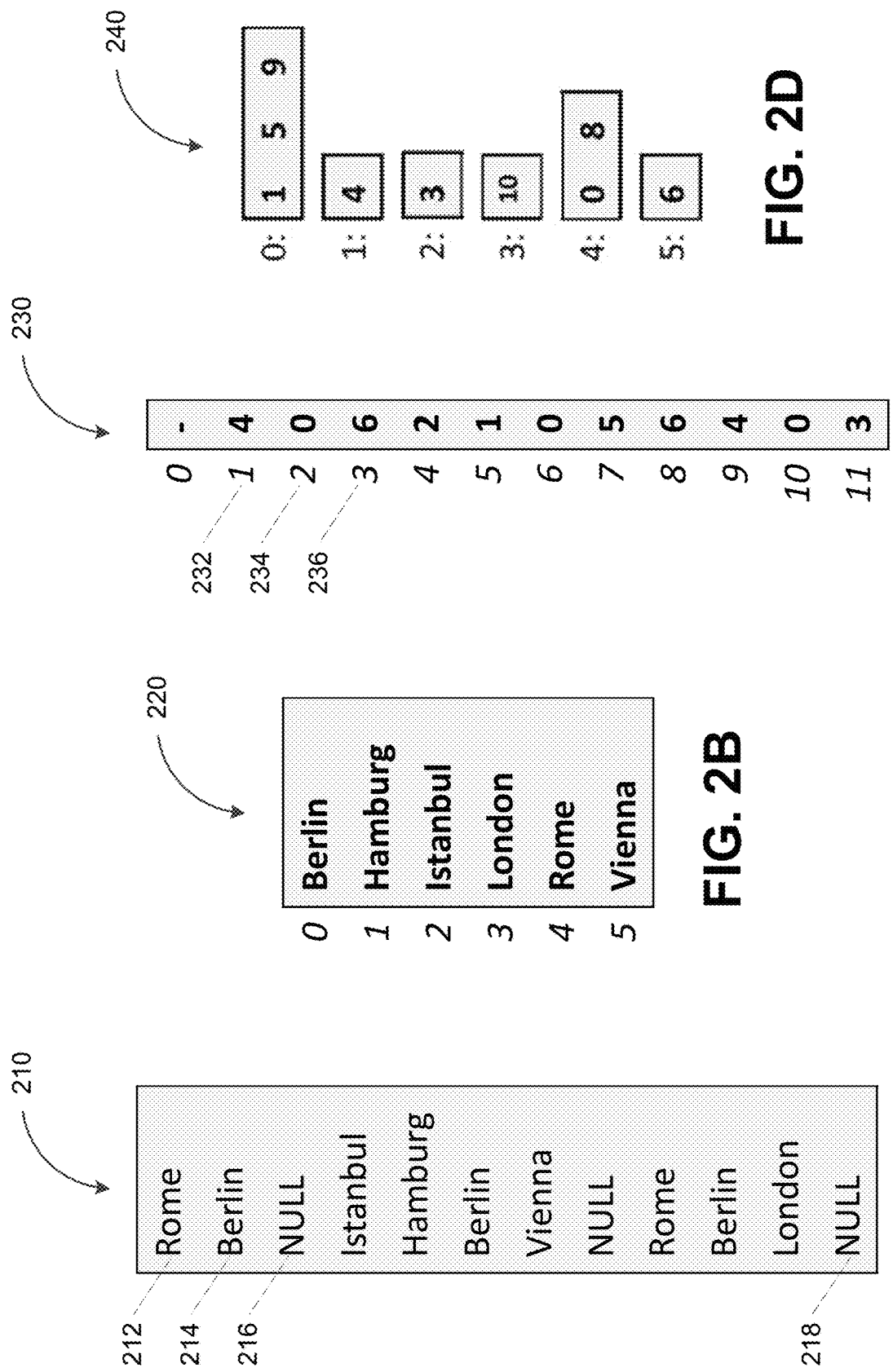

v = (0, 2, 4)
FIG. 3A
v = [1, 5)
FIG. 3B
v = (1, 0, 1, 0, 1, 0)
FIG. 3C
v = {[0, 3), [4, 5]}
FIG. 3D

US 10,671,625 B2

PROCESSING A QUERY PRIMITIVE CALL ON A VALUE IDENTIFIER SET

TECHNICAL FIELD

The subject matter described herein relates to database management, and more particularly, to value identifier sets for accessing data in a database.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In one aspect, methods, systems, and articles of manufacture, including computer program products, are provided. A system may include at last one data processor and at least one memory. The at least one memory may store instructions that results in operations when executed by the at least one data processor. The operations may include: executing, at an data management engine, a primitive call by at least performing a first operation with respect to a value identifier set, the value identifier set including one or more value identifiers, and the primitive call accessing database storing a plurality of value identifiers mapped to a corresponding plurality of data values; and generating, based at least on a result of the first operation, a result for the primitive call.

In some variations, one or more of the features disclosed herein including the following features may optionally be included in any feasible combination. The value identifier set may include at least one of an input and a result of the primitive call.

In some variations, the value identifier set may be associated with a first representation, the first representation being a vector, a range, a bit vector, or a ranges vector. The first operation may be converting the value identifier set from the first representation to a second representation. The first representation may be used at a query execution engine from which the data management engine receives the primitive call, and the data management engine may be configured to execute the primitive call based at least on the second representation of the value identifier set.

In some variations, the first operation may be iterating the value identifier set to at least retrieve, from the value identifier set, a first value identifier. The first operation may be determining, based at least on an indicator associated with the value identifier set, whether the one or more value identifiers are included in the value identifier set is sorted. The first operation may be determining whether a specific value identifier is included in the value identifier set. The first operation may be determining a number of value identifiers included in the value identifier set. The primitive call may implement a query operation on data at a database coupled with the data management engine.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A depicts a database column, in accordance with some example embodiments;

FIG. 2B depicts a dictionary, in accordance with some example embodiments;

FIG. 2C depicts a data vector, in accordance with some example embodiments;

FIG. 2D depicts an inverted index, in accordance with some example embodiments;

FIG. 3A depicts a representation of a value identifier set as a plain vector, in accordance with some example embodiments;

FIG. 3B depicts a representation of a value identifier set as a range, in accordance with some example embodiments;

FIG. 3C depicts a representation of a value identifier set as a bit vector, in accordance with some example embodiments;

FIG. 3D depicts a representation of a value identifier set as a ranges vector, in accordance with some example embodiments;

When practical, similar reference numbers denote similar structures, features, or elements.

DETAILED DESCRIPTION

Figure 1:
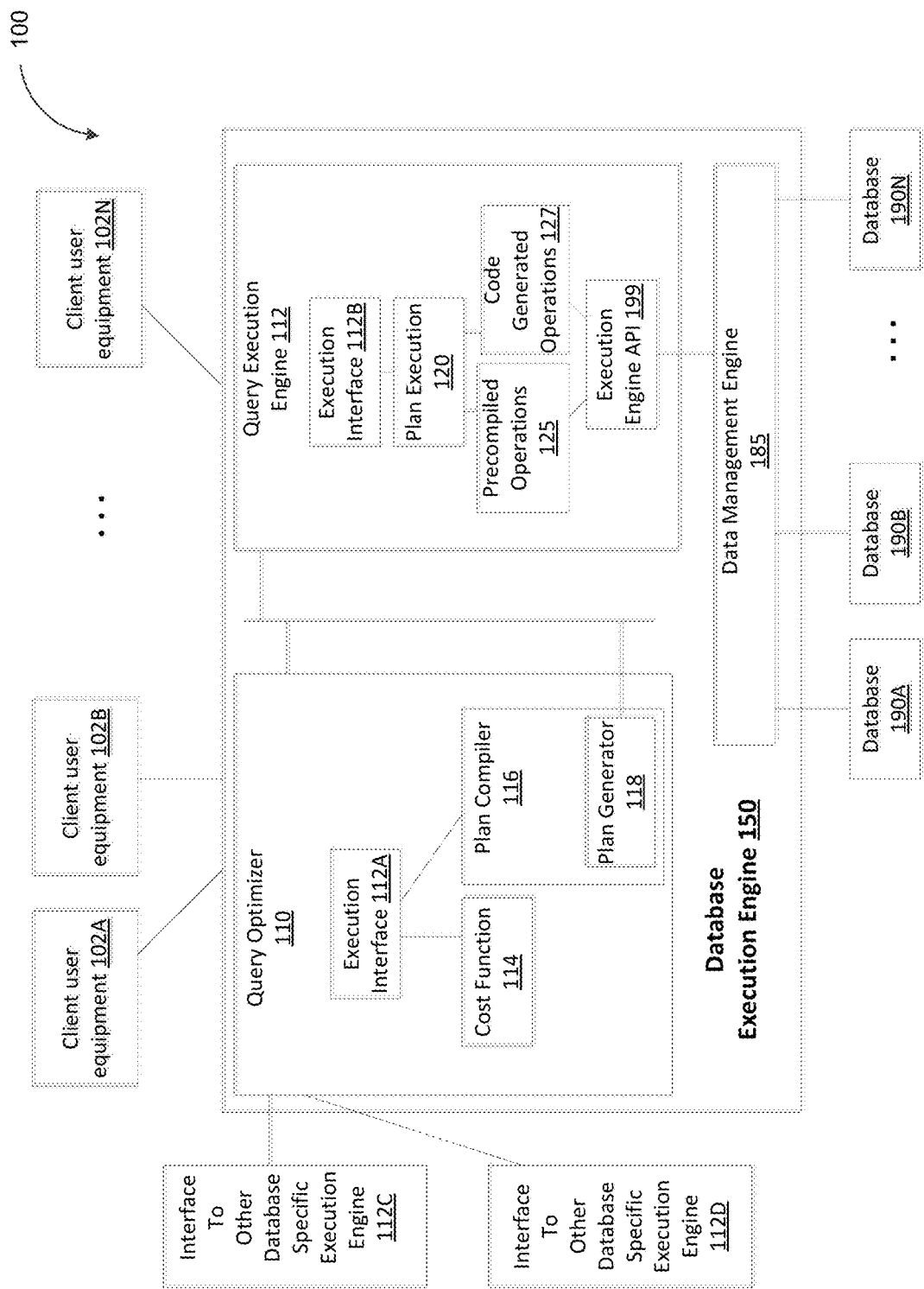
FIG. 1 depicts a block diagram for a system, in accordance with some example embodiments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have lighter weight and/or readily deployable applications. On the other hand, pushing complex operations to the database layer where data is stored may draw processing and/or memory resources at the database layer and may thus reduce the performance and response times for queries.

In some example embodiments, there may be provided an execution engine that may decouple the application layer from the database layer (e.g., the persistence or storage layer where data including database tables may be stored and/or queried). The execution engine may be separate from the database layer and the client application layer. According to some example embodiments, the execution engine may be configured to receive a query, generate a query plan (e.g., that includes one or more executable query operations. The execution engine may be further configured to optimize the query plan and compile the query plan by generating executable code (e.g., machine code) corresponding to the query plan.

In some example embodiments, the query plan may include at least some query operations that are executed by the execution engine itself. For instance, more complex query operations (e.g., rule-based query operations such as joins, projections, and/or the like) may be performed at the execution engine. For the query operations that are performed by the execution engine itself, the execution engine may perform these query operations while accessing the database layer whenever necessary, such as to read, scan, update, and/or perform other operations on the data stored and/or persisted at the database layer. According to some example embodiments, a data management engine may provide an application programming interface (API) for accessing the data that is stored and/or persisted at the database layer. For instance, the data management engine may be configured to support a plurality of primitive calls for accessing data at the database layer. As such, the execution engine may perform a query operation by atomizing the query operation into a plurality of corresponding primitive calls including, for example, dictionary lookup, cardinality estimation, search, materialization, and inverted index lookup. The primitive calls may be sent to the data management engine where the data management engine executes the primitive calls by at least accessing data at the database layer including, for example, one or more data vectors, dictionaries, and/or inverted indices. Meanwhile, the execution engine may determine the result of the query operation based at least on the individual results of the corresponding primitive calls returned from the data management engine.

In some example embodiments, the inputs and/or the results of a primitive call may be a value identifier (VID) set that includes a plurality of value identifiers. For instance, some primitive calls (e.g., dictionary lookup) may return a value identifier set, which includes the value identifiers of the data values provided as inputs of the dictionary lookup primitive call. Alternately and/or additionally, some primitive calls (e.g., cardinality estimation, search, and inverted index lookup) may accept, as an input, a value identifier set. According to some example embodiments, a value identifier set may be associated with one or more representations including, for example, a vector, a range, a ranges vector, and/or a bit vector. The data management engine may be configured to convert a value identifier set that is provided as an input for a primitive call (e.g., cardinality estimation, search, inverted index lookup) from one representation to another representation that may be more efficient for the execution of the primitive call. Alternately and/or additionally, the data management engine may be configured to convert a value identifier set that is a result of a primitive call (e.g., dictionary lookup) from one representation (e.g., that is used during the execution of the primitive call) to a different representation that may be used at the execution engine.

In some example embodiments, the execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform execution of a query plan for both types and send queries to the different types of database layers (and/or their storage/persistence layer) and handle the corresponding responses.

FIG. 1 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, scans, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and columns from Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimized query plan, which may represent query algebra or relational algebra, as noted above. To compile a query plan, the query optimizer 110 may provide the query plan to the query plan compiler 116 to enable compilation of some, if not all, of the code (e.g., for a query plan into machine code. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, the query plan compiler 116 may select pre-compiled code for a given operation as part of the optimization of the query plan, while for another operation in the query plan the plan compiler 116 may allow a compiler to generate the code. The pre-compiled and generated code represent code for executing the query plan, and this code may be provided to the plan generator 118, which interfaces the query execution engine 112.

In some example embodiments, the query plan compiler 116 may generate a query plan by at least translating the query plan into corresponding code. For instance, the query plan compiler 116 may combine the existing code for the pre-compiled query operations 125 with the dynamically generated code for the code-generating query operations 127. Moreover, because the pre-compiled query operations 125 and the code-generating query operations 127 may operate on and output different units of data, the query plan compiler 116 may insert adaptor code between the code corresponding to the pre-compiled query operations 125 and the code corresponding to the code-generating operations 127.

For instance, the pre-compiled query operations 125 may operate on individual rows of data while the code-generating query operations 127 may operate on data chunks that include multiple rows of data (e.g., from a database table). As such, for one or more pre-compiled query operations that follow one or more code-generating query operations, the query plan compiler 116 may insert, between the code for the pre-compiled query operation and the code for the preceding code-generating operations, adaptor code configured to decompose the data chunks output by the code-generating operations into one or more constituent rows of data that may be operated on by the pre-compiled query operation. Alternately and/or additionally, for one or more code-generating operations that follow one or more pre-compiled query operations, the query plan compiler 116 may insert, between the code for the code-generating query operations and the code for the preceding pre-compiled query operations, adaptor code configured to recompose the rows of data output by the pre-compiled query operations into data chunks that can be operated on by the code-generating query operation.

In some example embodiments, the query plan compiler 116 may generate a query plan that includes both full table query operations and split table query operations. A full table query operation may operate on tables as a whole because performing the operation may include simultaneously loading, examining and/or altering all of the data in the table. For example, sorting the rows of a table (e.g., a SQL ORDER BY command) and hash joining two or more tables are full table query operations that may be performed on tables as a whole. By contrast, a split table query operation may operate on portions of a table because the performing the operation may include separately loading, examining, and/or altering data from individual portions of the table. For instance, filtering, materialization (e.g., projection), and equipartitioned joins (e.g., between two table partitions) may be split table query operations that can be performed on individual portions of a table and not on the table as a whole. According to some example embodiments, the execution engine may replace a single split table query operation in the query plan with a plurality of parallel operations that each operates on a portion (e.g., partition and/or fragment) of the table.

In some example embodiments, to generate a query plan that includes both full table query operations and split table query operations, the query plan compiler 116 may insert one or more switch operations. According to some example embodiments, a switch operation may be inserted between a full table query operation and a split table query operation. A full table query operation may output a data chunk corresponding to a table in its entirety while a subsequent split table query operation operates on only portions (e.g., partition and/or fragment) of the table. As such, the switch operation may be configured to distribute data from the data chunk output by the full table query operation to each of the parallel operations forming the split table query operation.

In some example embodiments, the query plan compiler may be further configured to compile code in both high-level programming languages (e.g., C++) and low-level assembly language (e.g., low level virtual machine assembly language) into executable code, which may be directly executed by a computer processor and/or processing circuitry (e.g., numerical machine code and/or the like). The database execution engine 150 may further include a plan generator 118 configured to provide, to the query execution engine 112, the query plan subsequent to compilation by the plan compiler 116.

In some example embodiments, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, a query plan that has been generated and/or optimized by the query optimizer 110 and compiled by the plan compiler 116. It should be appreciated that the query execution engine 112 may also receive query plans and/or queries directly from a higher-level application or another device, such as user equipment 102A-N. The query execution engine 112 may then forward, via an execution interface 112B, the query plan to a plan execution engine 120. In some example embodiments, the plan execution engine 120 may step through the query plan and determine to delegate, for execution at one or more of the database layers 190A-N, at least some of the query operations from the query plan. Query operations delegated to the database layers 190A-N may be sent, to one or more of the database layers 190A-N, via an execution engine API 199.

To further illustrate the delegation of some query operations to the database layers 190A-N, Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operation at Table 1 would result in a call for a dictionary look up for a value "X," a data vector scan with a value identifier obtained from the dictionary look up, which results in a document identifier list. The value identifier may be a value that is mapped to the value "X" and may be stored at the databases 190A-B instead of the actual value "X." Then for each document identifier, a call is made to look up the value identifiers for columns A and B. The value identifiers may be used to look up dictionary values to materialize the columns A and B including the actual data values for those columns.

TABLE 1

| Operation | Calls made on Database API |
|---|---|
| 1) TableScan (Filter X = 1) | dictionary lookup for X + 1, which looks for the value identifier corresponding to the value "1." data vector scan with a value identifier from the lookup, which results in a document identifier (docid) list that identifies one or more rows in Table 1, for example, by providing the corresponding row position or row number for the value identifier. |
| 2) Materialization (Columns A, B) | For each document identifier, lookup value identifiers (valueids) for columns A + B. For the value identifiers, lookup dictionary value in dictionaries of A and B |

Alternately and/or additionally, the plan execution engine 120 may step through the query plan and determine to perform, within the database execution engine 150, at least some of the query operations from the query plan. Query operations performed within the database execution engine 150 may be atomized into primitive calls configured for accessing data stored at the database layers 190A-N. As shown in FIG. 1, the plan execution engine 120 may be coupled to a data management engine 185, which provides support for a plurality of primitive calls including, for example, dictionary lookup, cardinality estimation, materialization, search, and inverted index lookup. As such, the data management engine 185 may provide an API for accessing the database layers 190A-N.

In some example embodiments, to perform a query operation from the query plan within the database execution engine 150, the plan execution engine 120 may send, to the data management engine 185, one or more corresponding primitive calls. The data management engine 185 may execute the one or more primitive calls by at least accessing data from the database layers 190A-N and returning, to the plan execution engine 120, the results of the one or more primitive calls. The plan execution engine 120 may generate, based at least on the results of the one or more primitive calls, a result of the corresponding query operation.

According to some example embodiments, the data management engine 185 may operate on a value identifier set in order to execute a primitive call. The executing of a primitive call may require the data management engine 185 to perform one or more operations including, for example, constructing the value identifier set, identifying the representation associated with the value identifier set, identifying the sortedness of the value identifier set, determining the size of the value identifier set, determining whether the value identifier set is empty, determining whether a specific value identifier is included in the value identifier set, converting the value identifier set from one representation to another representation, and retrieving value identifiers from the value identifier set. For instance, to execute a primitive call for an inverted index lookup, the data management engine 185 may iterate through a value identifier set that is provided as an input for the primitive call and retrieve value identifiers that are then compared to an inverted index. Alternately and/or additionally, to execute a primitive call for a dictionary lookup, the data management engine 185 may generate a value identifier set that is returned as a result of the primitive call.

In some example embodiments, the data management engine 185 may be configured to convert the value identifier set that is provided as an input of a primitive call received at the data management engine 185. The data management engine 185 may receive a primitive call (e.g., cardinality estimation, search, inverted index lookup) that includes, as an input, a value identifier set having a first representation (e.g., vector, range, ranges vector, bit vector). The data management engine 185 may convert that value identifier set from the first representation to a second representation, which may be more efficient for executing the primitive call than the first representation of the value identifier set. For example, for executing a primitive call for an inverted index lookup, the data management engine 185 may convert a value identifier set that is received as an input of the primitive call into a bit vector, which may be more efficient for executing the inverted index lookup primitive call.

Alternately and/or additionally, the data management engine 185 may return, to the plan execution engine 120, a result of executing a primitive call (e.g., dictionary lookup). The result of executing the primitive call may include a value identifier set having a first representation (e.g., vector, range, ranges vector, bit vector). As such, the data management engine 185 may convert the value identifier set from the first representation to a second representation, which may be the representation of value identifier sets used at the query execution engine 112 and/or at the client user equipment 102A-N. According to some example embodiments, this conversion of a value identifier set from one representation to another representation may enable any representation of value identifier sets may be used at the query execution engine 112 and at the client user equipment 102A-N. Moreover, the conversion of value identifier sets at the data management engine 185 may remain transparent to the query execution engine 112 and the one or more client user equipment 102A-N.

To further illustrate the performance of a query operation within the database execution engine 150, Table 2 below depicts an example of a query operation that may be atomized, by the plan execution engine 120, into a plurality of primitive calls for execution by the data management engine 185. As shown in Table 2, the SELECT query operation may be atomized into a plurality of primitive calls including, for example, dictionary lookup, cardinality estimation, search, and materialization. The dictionary lookup primitive call may return a value identifier set while the cardinality estimation primitive call and the search primitive call may both accept, as inputs, a value identifier set. The data management engine 185 may execute the plurality of primitive calls by accessing data at the database layers 190A-N. For example, the data management engine 185 may execute the plurality of primitive calls by accessing one or more dictionaries, data vectors, and inverted indices at the database layer 190A-N. However, it should be appreciated that any query operation (e.g., SELECT, JOIN, AGGREGATE) from the query plan may be atomized into a same and/or different combination of primitive calls.

TABLE 2

| Operation | Primitive Calls made on Data management engine |
|---|---|
| 1) SELECT name, inhabitants FROM cities WHERE (name = London or name = Rome) | dictionary lookup for the value identifier of "London" and the value identifier of "Rome" cardinality estimation to determine an estimated number of matches for the value identifier for "London" and an estimated number of matches for the value identifier for "Rome" search a data vector for rows with value identifiers that match the value identifier of "London" and the value identifier of "Rome" materialize the result of the query operation by retrieving the actual data values (e.g., "London" and "Rome") occupying the rows with the matching value identifiers |

In some example embodiments, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer. Moreover, the query execution engine 150 may perform other operations including rule-based operations, such as joins and projections, as well as filtering, group by, multidimensional analysis, and/or the like to reduce the processing burden on the database layer.

In this way, the query execution engine 150 may perform these and other complex operations as part of a query plan, while the database's persistence/storage layer 190A-N can perform simpler operations to reduce the processing burden at the database's persistence/storage layer 190A-N.

In some example embodiments, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

FIG. 2A depicts a database column 210, in accordance with some example embodiments. Referring to FIG. 2A, data may be stored and/or persisted at a database (e.g. the database layers 190A-N) in one or more columns such as, for example, the database column 210. The database column 210 may include a plurality of rows including, for example, a first row 212, a second row 214, a third row 216, and a fourth row 218. As shown in FIG. 2, some of the rows in the database column 210 may store data values. For instance, the first row 212 may store the data value "Rome" while the second row 214 may store the data value "Berlin." Alternately and/or additionally, some of the rows in the database column 210 may not store any data values. These rows (e.g., the third row 216 and the fourth row 218) may store, for example, a NULL value.

FIG. 2B depicts a dictionary 220, in accordance with some example embodiments. In some example embodiments, the data stored and/or persisted at the database may be compressed using a dictionary-based encoding technique. As such, instead of storing the actual data values from the database column 210, the contents of the database column 210 may be compressed based on the dictionary 220. The dictionary 220 may provide mappings between value identifiers and data values. For instance, according to the dictionary 220, the data value "Berlin" may be mapped to the value identifier "0," the data value "Hamburg" may be mapped to the value identifier "1," and the data value "Istanbul" may be mapped to the value identifier "2." According to some example embodiments, the value identifiers may be stored implicitly. For instance, instead of explicitly storing the value identifiers "0," "1," and "2," these value identifiers may be reflected by their respective positions in the dictionary 220. That is, the value identifier for "Berlin" is "0" based on "Berlin" being the first entry in the dictionary 220 while the value identifier for "Hamburg" is "1" based on "Hamburg" being the second entry in the dictionary 220. Meanwhile, the last value identifier "6" may be implicitly associated with the NULL value and therefore does not appear in the dictionary 220.

FIG. 2C depicts a data vector, in accordance with some example embodiments. Referring to FIGS. 2A-C, the data values from the database column 210 may be compressed, based on the mappings provided by the dictionary 220, to generate the data vector 230. As shown in FIG. 2C, the data vector 230 may store, instead of the actual data value occupying each row of the database column 210, the value identifiers corresponding to these data values. For instance, the data vector 230 may include a plurality of rows including, for example, a first row 232, a second row 234, and a third row 236. The first row 232 of the data vector 230 may store the value identifier "4," which is mapped (e.g., based on the dictionary 220) to data value "Rome" that occupies the first row 212 of the database column 210. The second row 234 of the data vector 230 may store the value identifier "0," which is mapped (e.g., based on the dictionary 220) to the data value "Berlin" that occupies the second row 214 of the database column 210. The third row 236 of the data vector 230 may store the value identifier "6," which corresponds to the NULL value that is found at the third row 216 of the database column 210. According to some implementations of the current subject matter, the data vector 230 may be truncated to remove one or more last rows from the data vector 230, when these last rows of the data vector 230 store the value identifier "6," which corresponds to the NULL value that appear at the end of the data column 210 (e.g., the fourth row 218).

FIG. 2D depicts an inverted index 240, in accordance with some example embodiments. Referring to FIGS. 2A-D, the data vector 230 may be associated with the inverted index 240, which enumerates the rows from the data vector 230 occupied by each possible value identifier from the dictionary 220. For instance, as shown in FIG. 2D, the inverted index 240 may indicate that the value identifier "0," which is mapped to the data value "Berlin," appears in rows 1 and 9 of the data vector 230. Similarly, the inverted index 240 may indicate that the value identifier "1," which is mapped to the data value "Hamburg," appears in row 5 of the data vector 230.

According to some example embodiments, a value identifier set may include a plurality of value identifiers (e.g., 0, 1, 2, 4, 5), which may correspond to data values (e.g., Berlin, Hamburg, Istanbul, Rome, Vienna). A value identifier set may be associated with one or more different representation including, for example, as a vector, as a range, as a ranges vector, and/or as a bit vector. FIG. 3A depicts a representation of a value identifier set as a plain vector 310, in accordance with some example embodiments. In some example embodiments, the plain vector 310 may be used to represent a value identifier set having at least a pair of non-consecutive value identifiers. As shown in FIG. 3A, the plain vector 310 may enumerate every value identifier that appears in the value identifier set including, for example, the value identifier "0," the value identifier "2," and the value identifier "4."

FIG. 3B depicts a representation of a value identifier set as a range 320, in accordance with some example embodiments. According to some example embodiments, a value identifier set that includes a sequence of consecutive value identifiers (e.g., the value identifier set {1, 2, 3, 4}) may be compressed and represented as the range 320. As such, instead of enumerating every value identifier present in the value identifier set, the value identifier set may be represented using a first value 322 corresponding to a lower bound of the range 320 and a second value 324 corresponding to an upper bound of the range 320. As shown in FIG. 3B, the range 320 may include the specified lower bound (e.g., the first value 322), as denoted by the "[." The range 320 may further exclude the specified upper bound (e.g., the second value 324), as denoted by the ")." However, it should be appreciated that the range 320 may be denoted to include and/or exclude the specified lower and/or upper bound.

FIG. 3C depicts a representation of a value identifier set as a bit vector 330, in accordance with some example embodiments. Referring to FIG. 3C, the bit vector 330 may include a sequence of bits that correspond to a sequence of value identifiers. For a value identifier that is present in the value identifier set, a corresponding bit in the bit vector 330 may be set to a value of "1." By contrast, for a value identifier that is absent from the value identifier set, a corresponding bit in the bit vector 330 may be set to a value of "0." For example, the bit vector 330 may represent the value identifier set {0, 2, 4}. Accordingly, the first, third, and the fifth bit, which correspond respectively to the value identifiers "0," "2," and "4," may be set to "1." Meanwhile, the second, fourth, and the sixth bit in the bit vector 300, which correspond respectively to the value identifiers "1," "3," and "5," may be set to "0." According to some example embodiments, the bit vector 330 may be used to represent large sets of distributed (e.g., unsorted) value identifiers. For instance, a primitive call for an inverted index lookup (e.g., a lookup of the inverted index 240) may be more efficiently executed on a value identifier set that is represented as the bit vector 330.

FIG. 3D depicts a representation of a value identifier set as a ranges vector 340, in accordance with some example embodiments. According to some example embodiments, the ranges vector 340 may represent a value identifier set that includes multiple sequences of consecutive value identifiers such as, for example, the value identifier set {0, 1, 2, 4, 5}. As shown in FIG. 3D, instead of enumerating every value identifier present in the value identifier set, the value identifier set may be represented using the respective lower bound and upper bound of each sequence of value identifiers present in the value identifier set.

In some example embodiments, a value identifier set (e.g., the vector 310, the range 320, the bit vector 330, and the ranges vector 340) may be associated with an indicator (e.g., a bit value of "1" or "0") that signifies whether the value identifiers included in the value identifier set are sorted. For instance, the vector 310 may be the result of executing a primitive call for a dictionary lookup, which may include performing one or more comparisons (e.g., equal to, not equal to, greater than, greater than or equal to, less than, less than or equal to) against a dictionary (e.g., the dictionary 220) that is sorted based on value identifiers. Accordingly, the value identifiers in the vector 310 may be sorted and the vector 310 may therefore be stored with an indicator (e.g., a bit value of "1") that the value identifiers included the vector 310 are sorted. Alternately, the value identifiers in the vector 310 may be unsorted and/or the sortedness of the value identifiers in the vector 310 may be unknown. In these scenarios, the vector 310 may be stored with a corresponding indicator (e.g., a bit value of "0") that the value identifiers in the vector 310 are not sorted and/or of unknown sortedness. According to some example embodiments, in order to perform a primitive call that requires one or more operations on a value identifier set, the data management engine 185 may determine, based on this indicator, the sortedness of the value identifier set.

According to some example embodiments, the data management engine 185 may be configured to execute one or more primitive calls including, for example, dictionary lookup, cardinality estimation, search, materialization, and inverted index lookup. For instance, the data management engine 185 may receive, from the query execution engine 112, the one or more primitive calls corresponding to a query operation that is being performed by the query execution engine 112. The data management engine 185 may execute the one or more primitive calls by at least accessing the data stored and/or persisted at the database layers 190A-N including, for example, the dictionary 220, the data vector 230, and/or the inverted index 240. The data management engine 185 may further return, to the query execution engine 112, the results of the one or more primitive calls. It should be appreciated that any query operation (e.g., SELECT, JOIN, AGGREGATE) may be performed by executing a combination of one or more primitive calls including, for example, dictionary lookup, cardinality estimation, search, materialization, and inverted index lookup.

In some example embodiments, the inputs of a primitive call may include a value identifier set having a first representation such as, for example, a vector (e.g., the vector 310), a range (e.g., the range 320), a bit vector (e.g., the bit vector 330), or a ranges vector (e.g., the ranges vector 340). The data management engine 185 may be configured to convert the value identifier set from the first representation to a second representation, which may be more efficient for executing the primitive call. For example, the primitive call for an inverted index lookup may be more efficiently executed on a value identifier set that is represented as a bit vector (e.g., the bit vector 330). As such, when the data management engine 185 receives an inverted index lookup primitive call with a value identifier set that is represented as a vector, a range, and/or a ranges vector, the data management engine 185 my convert this value identifier set to a bit vector such that the inverted index lookup primitive call may be executed more efficiently.

In some example embodiments, the results of a primitive call may include a value identifier set having a first representation such, as for example, a vector (e.g., the vector 310), a range (e.g., the range 320), a bit vector (e.g., the bit vector 330), or a ranges vector (e.g., the ranges vector 340). The data management engine 185 may be configured to convert the value identifier set from the first representation to a second representation that may be used at the query execution engine 112 and/or the client user equipment 102A-N. For example, the data management engine 185 may execute a primitive call for a dictionary lookup, which may return a value identifier set that is represented as a vector (e.g., the vector 310). The data management engine 185 may convert the value identifier set from the vector representation to a different representation (e.g., range, bit vector, ranges vector) that is used at the query execution engine 112 and/or the client user equipment 102A-N.

According to some example embodiments, the conversion of a value identifier set at the data management engine 185 (e.g., from one representation to another representation) may be transparent to the query execution engine 112 and/or the client user equipment 102A-N. This conversion of a value identifier set may further enable any representation of value identifier sets to be used at the query execution engine 112 and/or the client user equipment 102A-N.

In order to execute primitive call having value identifier sets as inputs and/or results, the data management engine 185 may perform a plurality operations with respect to a value identifier set including, for example, constructing the value identifier set, identifying the representation associated with the value identifier set, identifying the sortedness of the value identifier set, determining the size of the value identifier set, determining whether the value identifier set is empty, determining whether a specific value identifier is included in the value identifier set, and converting the value identifier set from one representation to another representation. Table 3 below depicts pseudo program code implementing operations that may be performed with respect to a value identifier set.

TABLE 3

```
ValueIDSet {
public:
    // Construct an empty ValueIdSet, kind will be Vector
    ValueIdSet( )
    // Construct a ValueIdSet of the given representation.
```

TABLE 3-continued

```
    ValueIdSet(vector(ValueId> valueIds, IsSorted isSorted)
    ValueIdSet(valueIdRange valueIds, IsSorted isSorted)
    ValueIdSet(vectorKValueIdRange> valueIds, IsSorted isSorted)
    ValueIdSet(Bitvector valueIds) // no isSorted parameter, because
    implicitly sorted
    // Return type of internal representation.
    Kind getKind( )
    // Return type of internal sorting.
    IsSorted getIsSorted( )
    // How many valueIds are in this ValueIdSet?
    int size( )
    // Returns true, if this ValueIdSet contains no valueIds.
    bool empty( )
    // Is valueId contained in this ValueIdSet?
    bool contains(ValueId valueId)
    // Get internal representation
    vector<ValueId> getNative_vector( )
    ValueIdRange getNative_range( )
    vectorKValueIdRange> getNative_rangesVector( )
    BitVector getNative_bitVector( )
    // Convert to ValueIdSet of given kind. Conversion might fail if
    // the target kind is Range
    ValueIdSet convertTo(Kind kind)
private:
    // How are the stored valueIds internally represented?
Kind m_kind
    // Are the stored valueIds internally sorted?
    IsSorted m_isSorted
}
```

In some example embodiments, the execution of one or more primitive calls may further require the data management engine 185 to iterate through at least a portion of a value identifier set in order to retrieve one or more value identifiers from the value identifier set. Table 4 below depicts pseudo program code implementing an iterator for retrieving one or more value identifiers from a value identifier set. This iterator may be configured to retrieve value identifiers from a value identifier set having any representation. That is, the iterator may be able to retrieve value identifiers from a value identifier set, whether the value identifier set is represented as a vector (the vector 310), a range (e.g., the range 320), a bit vector (e.g., the bit vector 330), or a ranges vector (e.g., the ranges vector 340).

TABLE 4

```
//Generic access iterator to retrieve valueIds from a ValueIdSet regardless
//of the internal representation:
ValueIdSetIterator {
public:
    // Construct an iterator for 'valueIdSet'. If 'sort' is true, the valueIds
    // are returned in monotonically increasing order. This incurs a possibly
    // expensive sorting step, if the valueIds are not known to be pre-sorted.
    Iterator(ValueIdSet valueIdSet, bool sort);
    // Returns (true, ValueId) if another ValueId could be retrieved, else
    // (false, ValueId).
    (bool, ValueId) getNext( )
```

Figure 4:
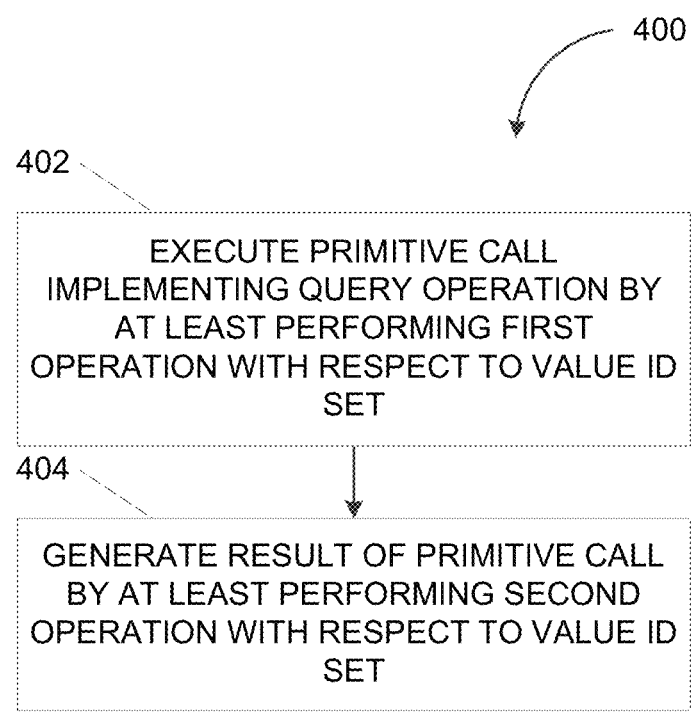
FIG. 4 depicts a flowchart illustrating a process for executing a query operation, in accordance with some example embodiments.

FIG. 4 depicts a flowchart illustrating a process 400 for executing a query operation, in accordance with some example embodiments. Referring to FIGS. 1-4, the process 400 may be performed at the database execution engine 150, for example, by the data management engine 185.

The database execution engine 150 may execute a primitive call implementing a query operation by at least performing a first operation with respect to a value identifier set (402). For example, the data management engine 185 may receive, from the query execution engine 112, a primitive call such as, for example, dictionary lookup, cardinality estimation, search, and materialization. The primitive call may be one or more primitive calls that implement a query operation such as, for example, SELECT, JOIN, and AGGREGATE. In some example embodiments, the inputs of the primitive call may include a value identifier set having a first representation such as, for example, a vector (e.g., the vector 310), a range (e.g., the range 320), a bit vector (e.g., the bit vector 330), or a ranges vector (e.g., the ranges vector 340). As such, in order to execute the primitive call, the data management engine 185 may perform one or more operations on the value identifier set provided as an input for the primitive call. For instance, in some example embodiments, the data management engine 185 may convert the value identifier set from one representation that may be used at the query execution engine 112 and/or the client user equipment 102A-N to another representation that may be more efficient for executing the primitive call. The data management engine 185 may also iterate through the value identifier set in order to retrieve one or more value identifiers from the value identifier set. Alternately and/or additionally, the data management engine 115 may execute the primitive call by at least identifying the representation associated with the value identifier set, identifying the sortedness of the value identifier set, determining the size of the value identifier set, determining whether the value identifier set is empty, and/or determining whether a specific value identifier is included in the value identifier set.

The database execution engine 150 may generate a result for the primitive call by at least performing a second operation with respect to the value identifier set (404). In some example embodiments, the result of a primitive call may include a value identifier set. As such, in order to generate the result of the primitive call, the data management engine 185 may perform one or more operations including, for example, generating a value identifier set that includes a result of primitive call. Alternately and/or additionally, the data management engine 185 may convert the value identifier set that is the result of the primitive call from one representation that may be more efficient for executing the primitive call to another representation that may be used at the query execution engine 112 and/or at the client user equipment 102A-N.

Figure 5:
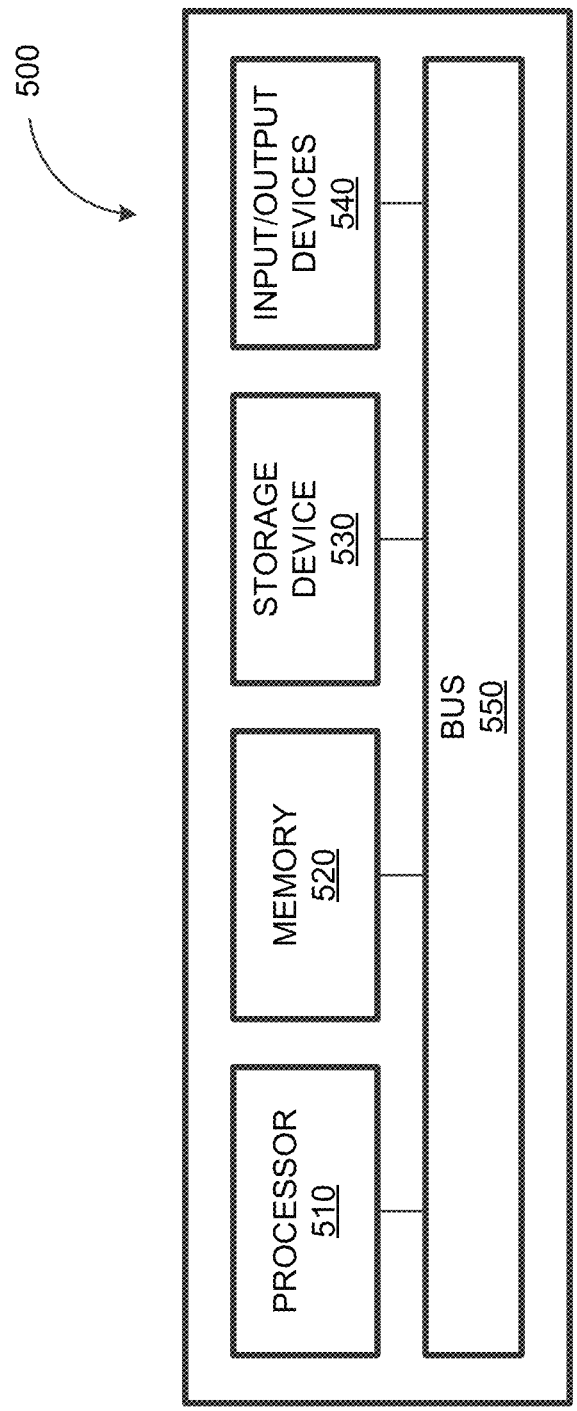
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the execution engine 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the execution engine 150. In some example embodiments of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments of the current subject matter, the input/output device 540 includes a keyboard and/or pointing device. In various implementations, the input/output device 540 includes a display unit for displaying graphical user interfaces.

According to some example embodiments of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   converting a value identifier set from a first representation to a second representation, the value identifier set including one or more value identifiers, the first representation of the value identifier set comprising a bit vector including a first value to indicating one or more value identifiers present in the value identifier set and a second value indicating one or more value identifiers absent from the value identifier set, and the second representation comprising a ranges vector enumerating one or more ranges formed by the one or more value identifiers present in the value identifier set; and
   executing a primitive call accessing a database storing a plurality of value identifiers mapped to a corresponding plurality of data values, the executing of the primitive call includes performing one or more operations on the converted value identifier set.

2. The system of claim 1, wherein the value identifier set comprises at least one of an input and a result of the primitive call.

3. The system of claim 1, further comprising:
   converting the value identifier set from the second representation to a third representation comprising a vector, the vector indicating the one or more values identifiers present in the value identifier set by at least enumerating each of the one or more value identifiers.

4. The system of claim 1, wherein the first representation is used at a query execution engine from which the data management engine receives the primitive call, and wherein the data management engine is configured to execute the primitive call based at least on the second representation of the value identifier set.

5. The system of claim 1, further comprising:
   iterating the value identifier set to at least retrieve, from the value identifier set, the one or more value identifiers present in the value identifier set.

6. The system of claim 1, further comprising:
   determining, based at least on an indicator associated with the value identifier set, whether the one or more value identifiers are included in the value identifier set is sorted.

7. The system of claim 1, further comprising:
   determining, based at least on a first indicator associated with the first representation of the value identifier set or a second indicator association with the second representation of the value identifier set, whether a specific value identifier is included in the value identifier set.

8. The system of claim 1, further comprising:
   determining, based at least on a first indicator associated with the first representation of the value identifier set or a second indicator association with the second representation of the value identifier set, a quantity of value identifiers included in the value identifier set.

9. The system of claim 1, wherein the primitive call implements a query operation on data at a database coupled with the data management engine.

10. The system of claim 1, wherein the ranges vector includes a lower bound and an upper bound associated with each of the plurality of ranges.

11. A computer-implemented method, comprising:
    converting a value identifier set from a first representation to a second representation, the value identifier set including one or more value identifiers, the first representation of the value identifier set comprising a bit vector including a first value to indicating one or more value identifiers present in the value identifier set and a second value indicating one or more value identifiers absent from the value identifier set, and the second representation comprising a ranges vector enumerating one or more ranges formed by the one or more value identifiers present in the value identifier set; and executing a primitive call accessing a database storing a plurality of value identifiers mapped to a corresponding plurality of data values, the executing of the primitive call includes performing one or more operations on the converted value identifier set.

12. The method of claim 11, wherein the value identifier set comprises at least one of an input and a result of the primitive call.

13. The method of claim 11, further comprising:
converting the value identifier set from the second representation to a third representation comprising a vector, the vector indicating the one or more values identifiers present in the value identifier set by at least enumerating each of the one or more value identifiers.

14. The method of claim 11, further comprising:
iterating the value identifier set to at least retrieve, from the value identifier set, the one or more value identifiers present in the value identifier set.

15. The method of claim 11, further comprising:
determining, based at least on an indicator associated with the value identifier set, whether the one or more value identifiers are included in the value identifier set is sorted.

16. The method of claim 11, further comprising:
determining, based at least on a first indicator associated with the first representation of the value identifier set or a second indicator association with the second representation of the value identifier set, whether a specific value identifier is included in the value identifier set.

17. The method of claim 11, further comprising:
determining, based at least on a first indicator associated with the first representation of the value identifier set or a second indicator association with the second representation of the value identifier set, a quantity of value identifiers included in the value identifier set.

18. The method of claim 11, wherein the primitive call implements a query operation on data at a database coupled with the data management engine.

19. A non-transitory computer readable medium storing instructions, which, when executed by at least one data processor forming at least one computing system, results in operations comprising:

converting a value identifier set from a first representation to a second representation, the value identifier set including one or more value identifiers, the first representation of the value identifier set comprising a bit vector including a first value to indicating one or more value identifiers present in the value identifier set and a second value indicating one or more value identifiers absent from the value identifier set, and the second representation comprising a ranges vector enumerating one or more ranges formed by the one or more value identifiers present in the value identifier set; and executing a primitive call accessing a database storing a plurality of value identifiers mapped to a corresponding plurality of data values, the executing of the primitive call includes performing one or more operations on the converted value identifier set.

* * * * *